US011988748B2

(12) United States Patent
Panas et al.

(10) Patent No.: US 11,988,748 B2
(45) Date of Patent: May 21, 2024

(54) SYSTEM AND METHOD FOR ADAPTABLE LIDAR IMAGING

(71) Applicant: Lawrence Livermore National Security, LLC, Livermore, CA (US)

(72) Inventors: Robert Matthew Panas, Dublin, CA (US); Phillip Harris Paul, San Francisco, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 968 days.

(21) Appl. No.: 16/139,895

(22) Filed: Sep. 24, 2018

(65) Prior Publication Data

US 2020/0096639 A1 Mar. 26, 2020

(51) Int. Cl.
*G01S 17/66* (2006.01)
*G01S 7/481* (2006.01)
*G01S 7/484* (2006.01)
*G01S 7/486* (2020.01)
*G01S 17/89* (2020.01)
(Continued)

(52) U.S. Cl.
CPC ............ *G01S 17/66* (2013.01); *G01S 7/4815* (2013.01); *G01S 7/4817* (2013.01); *G01S 7/484* (2013.01); *G01S 7/4868* (2013.01); *G01S 17/89* (2013.01); *G06V 10/22* (2022.01); *G06V 20/56* (2022.01)

(58) Field of Classification Search
CPC ........ G01S 17/89; G01S 7/4815; G01S 7/484; G01S 7/4868; G01S 7/4817; G01S 17/931; G01S 17/42; G01S 17/66; G06K 9/209; G06K 9/2054; G06K 2209/40; G06K 9/00791
See application file for complete search history.

(56) References Cited

U.S. PATENT DOCUMENTS 5,270,780 A * 12/1993 Moran .................... G01S 17/18
356/5.04
5,638,164 A *  6/1997 Landau ................ G01S 7/4802
356/5.01
(Continued)

FOREIGN PATENT DOCUMENTS

EP         2126607 B1 *  1/2013    ............ G01S 17/32
EP         3187895 A1     7/2017
(Continued)

OTHER PUBLICATIONS

English version of Schuler et al. (EP 2126607 B1) (Year: 2013).*
International Search Report and Written Opinion, KR/ISR, corresponding to PCT/US2019/041066, dated Oct. 30, 2019.

*Primary Examiner* — Yuqing Xiao
*Assistant Examiner* — Jempson Noel
(74) *Attorney, Agent, or Firm* — HARNESS, DICKEY & PIERCE, P.L.C.

(57) ABSTRACT

The present disclosure relates to an adaptive light detection and ranging (lidar) system. In one implementation the system may have a controller and lidar control software in communication with the controller. A focusing control subsystem may be included which is configured to control focusing and detection of a laser beam. An emitter/detector subsystem may be included which is responsive to commands from the focusing control subsystem to generate at least one laser beam which is used to implement a plurality of different focusing modes for imaging a scene.

20 Claims, 3 Drawing Sheets

(51) Int. Cl.
*G06V 10/22* (2022.01)
*G06V 20/56* (2022.01)

(56) References Cited

U.S. PATENT DOCUMENTS

| | | | | |
|---|---|---|---|---|
| 7,064,810 | B2 * | 6/2006 | Anderson | G01S 7/4814 |
| | | | | 356/5.01 |
| 7,741,618 | B2 * | 6/2010 | Lee | G01S 17/88 |
| | | | | 250/458.1 |
| 9,310,471 | B2 * | 4/2016 | Sayyah | H01S 5/0262 |
| 9,869,754 | B1 * | 1/2018 | Campbell | G01S 7/4817 |
| 10,007,001 | B1 * | 6/2018 | LaChapelle | G01S 7/4802 |
| 10,191,156 | B2 * | 1/2019 | Steinberg | G01S 7/486 |
| 10,527,726 | B2 * | 1/2020 | Bartlett | G01S 17/42 |
| 10,649,072 | B2 * | 5/2020 | Bozchalooi | G01S 17/931 |
| 2007/0112256 | A1 * | 5/2007 | Terakawa | G02B 6/06 |
| | | | | 385/119 |
| 2010/0001897 | A1 | 1/2010 | Lyman | |
| 2010/0166430 | A1 * | 7/2010 | Alten | H04B 10/1141 |
| | | | | 398/135 |
| 2011/0164783 | A1 | 7/2011 | Hays et al. | |
| 2011/0304498 | A1 | 12/2011 | Yanagihara et al. | |
| 2016/0071416 | A1 * | 3/2016 | Kim | G01S 17/931 |
| | | | | 701/70 |
| 2017/0003392 | A1 | 1/2017 | Bartlett et al. | |
| 2017/0203682 | A1 | 7/2017 | Atsmon | |
| 2017/0242104 | A1 | 8/2017 | Dussan | |
| 2017/0242107 | A1 | 8/2017 | Dussan et al. | |
| 2018/0329037 | A1 * | 11/2018 | Bozchalooi | G01S 7/4815 |
| 2018/0348344 | A1 * | 12/2018 | Wyrwas | G01S 7/4816 |

FOREIGN PATENT DOCUMENTS

| WO | WO-2015156780 A1 * | 10/2015 | G02B 21/0032 |
|---|---|---|---|
| WO | WO-2015156783 A1 * | 10/2015 | G02B 21/0032 |

\* cited by examiner

SYSTEM AND METHOD FOR ADAPTABLE LIDAR IMAGING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to Lidar systems and methods, and more particularly to Lidar systems and methods having user variable image capture parameters to reduce a required mechanical bandwidth of image transfer and thus processing workload.

BACKGROUND

This section provides background information related to the present disclosure which is not necessarily prior art.

Light Detection and Ranging (lidar) imaging systems traditionally have been designed around a single consistent, repetitive and non-variable scanning operation. This is usually a raster scan, where a 2D image is built up line by line. This only requires a simple mechanical operation (repetitive oscillation), and so has been implemented with spinning or oscillating mirrors. The use of a nonadaptive scanning process generally limits the resolution and rate to preset values. The limitation of such an oscillation-based approach is that the data gathering effort is unable to adapt to priorities set by an image processing algorithm being used with the system. Priorities occur in cases where certain areas of the image are more valuable than others, such as in a self-driving car, where a section of the road directly ahead of the vehicle is highly valuable, but areas off the road or well beyond the area immediately ahead of the vehicle need only be scanned occasionally. Another example is while making a turn with a car, where the area of value becomes shifted to the side that the vehicle is moving toward. This re-valuation is also driven by the previous data captures, where a reading from a previous measurement suggestive of an object may be judged a priority and the area given high value for further study. The adaptability needed to perform this type of "shift in focus" equivalent to an eye is not possible with present day scanning lidar technology. The system must simply wait until the scanner comes back to the area again, or the object of interest gets closer. This can be a significant issue with fast moving vehicles that have low return reflectivity coatings, thus lowering their lidar return signature at distance. In such cases, the lidar on a given vehicle will have no ability to study the object until the vehicle is undesirably close to the object. Additionally, the lidar system on the vehicle may trigger off from random noise in the environment, such as detection of an airborne leaf or interference due to another lidar operating in the same area, without being able to focus on the spot to clarify the reading. Such lack of focusability lowers the quality of the data received, as the vast majority of collected data is of little interest, yet still must be collected. It also slows the response of the image processing and analysis software associated with the vehicle's lidar, which must sift through the low quality data to find useful points, and wait for the object to get closer before fine details can be discerned.

Recent developments in micromirror technology have opened up the potential for high mechanical bandwidth/high resolution beam steering of one or more laser beams. Such precision beam steering can be operated in adaptive, non-repetitive, non-scanning modes. The high mechanical bandwidth operation is critical for the device to rapidly shift around in a non-scanning mode and point in areas of high value.

SUMMARY

This section provides a general summary of the disclosure, and is not a comprehensive disclosure of its full scope or all of its features.

In one aspect the present disclosure relates to an adaptive light detection and ranging (lidar) system. The system may comprise a controller, lidar control software in communication with the controller, a focusing control subsystem configured to control focusing and detection of a laser beam, and an emitter/detector subsystem. The emitter/detector subsystem may be responsive to commands from the focusing control subsystem to generate at least one laser beam. The laser beam may be used to implement a plurality of different focusing modes for imaging a scene.

In another aspect the present disclosure an adaptive light detection and ranging (lidar) system. The system may comprise an electronic controller, a memory, lidar control software contained in the memory and in communication with the controller; a focusing control subsystem in communication with the electronic controller and configured to control focusing and detection of a laser beam; and an emitter/detector subsystem. The emitter/detector subsystem may be in communication with the electronic controller and responsive to commands from the focusing control subsystem to generate at least one laser beam. The at least one laser beam may be used to implement a plurality of different focusing modes for imaging a scene. The emitter/detector subsystem may include a digital micromirror assembly having a plurality of digitally controllable micromirrors. The micromirrors may be used for controlling pointing of the at least one laser beam as the at least one laser beam is emitted toward the scene, and for reception of reflected optical signals from a selected portion of the scene.

In still another aspect the present disclosure relates to an adaptive light detection and ranging (lidar) method. The method may comprise using a focusing control subsystem configured to control focusing and detection of a laser beam. The method may further include using an emitter/detector subsystem responsive to commands from the focusing control subsystem to generate at least one laser beam which is used to implement a plurality of different focusing modes for imaging a scene. The method may further include switching between two or more of the different focusing modes while using the laser beam to image the scene.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, in which.

DETAILED DESCRIPTION

Example embodiments will now be described more fully with reference to the accompanying drawings.

As noted in the "Background" section above, there are then at least two distinct needs that the present disclosure addresses: 1) for adaptive scanning, to effectively use sensor and processing bandwidth to best meet the requirements of real world conditions in the operative environment, and 2) to adaptively detect meaningful signal and at the same time minimize stray light, particularly from other like systems in the operating environment. The present disclosure addresses both these needs.

The various embodiments and methods presented in the present make use of recent developments in micromirror technology, which enables high mechanical bandwidth, high resolution beam steering of one or more laser beams to be achieved to optimize a lidar system for real time conditions/situations in the operating environment. The present disclosure applies these teachings to significantly enhance the capabilities of a lidar system and method in both object tracking, and also in optimizing high bandwidth operation for a lidar system. The various embodiments of the present disclosure described herein are directed to an adaptive lidar system with the ability to point one or more lasers, using one or more wavelengths, at one or more subregions of an object or scene being imaged. If two or more distinct beams are employed, then each beam may be steered using a beam steering subsystem that employs an array of steering mechanisms that can be independently operated. The steering mechanism(s) are capable of achieving arbitrary pointing rather than simple resonant or scanning operation. One preferred mode of operation is to implement the beam steering subsystem using an array of micromirrors which control the pointing directions of an array of lasers output from the lidar unit, where each laser is—steered by a specific set of mirrors. The source of the laser light may be either a single beam that is distributed over the micromirror array, or an array of emitters. In all cases, the emitted light is shined on the array in a generally collimated fashion and steered out of the lidar unit by the array of mirrors. Each mirror is able to independently point the laser light reflecting off it, becoming effectively its own laser beam outside of the device. The array of micromirrors is preferred rather than a single mirror, as the array can achieve much higher mechanical bandwidths due to the lower inertia of each constituent element.

Figure 1:
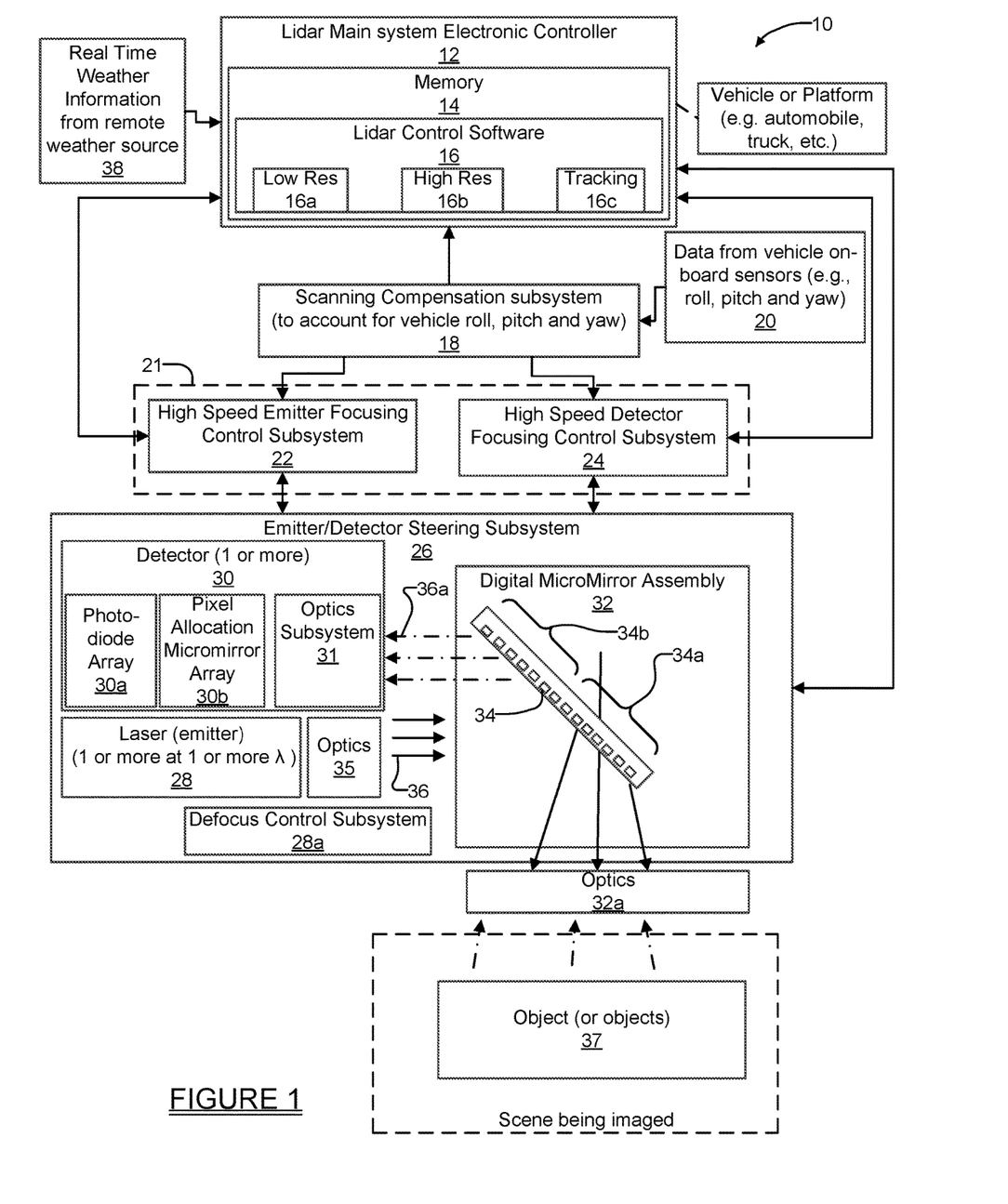
FIG. 1 is a high level block diagram of one embodiment of an adaptive Lidar system in accordance with the present disclosure.

Referring to FIG. 1, one embodiment of an adaptive Lidar system 10 is shown. In this example the system 10 may include a Lidar main system electronic controller 12 (hereinafter simply "controller" 12), having memory 14 included or accessible to it. The memory 14 may be a non-volatile memory such as, for example and without limitation, non-volatile RAM or ROM, and may contain Lidar control software 16 for helping to control aiming of a laser beam from the system as well as real time interpreting/detecting of objects within an imaged scene, and distances to such objects. The Lidar control software 16 may include a plurality of software submodules for implementing adaptive operating modes, for example a "low resolution" mode 16a, where repeated scans are made across an entire scene, a "high resolution" mode 16b where a selected subregion or object within the scene is focused on, and a "tracking mode" 16c where a stationary or moving object within the scene is tracked continuously for a given time. These modes 16a-16c may be used one at a time or in a multiplexed fashion in various combinations so that the system 10 can be best adapted to meet specific situations. These features will be explained in greater detail in the following paragraphs. However, it will be appreciated that the present system 10 and method is not limited only to modes 16a-16c, and that other modes, which may possibly even be different combinations of modes 16a-16c, are within the scope of the present disclosure.

The controller 12 may receive information from a scanning compensation subsystem 18 to account for vehicle movement, such as elevational position changes of the vehicle, roll, pitch, yaw, etc. The scanning compensation subsystem 18 generates the information from raw data received from vehicle on-board sensors 20 (e.g., gyroscope(s), roll sensor, pitch sensor, yaw sensor, etc.) that are commonly used on present day motor vehicles. Any sensing gaps (e.g. lack of gyros in a vehicle) in the vehicle on-board sensors can be supplemented with sensors included in the lidar system. And while the system 10 is expected to find particular utility in connection with motor vehicles such as passenger cars and trucks, as well as commercial trucks and delivery vehicles, the system 10 is also usable with a wide variety of other types of vehicles, for example marine vessels, aircraft, remotely controlled drones, and even earth moving equipment, off road vehicles (ATVs), and even railway vehicles (e.g., trains). In particular, the system 10 is expected to find significant utility in autonomous land, maritime and aviation vehicle applications.

The scanning compensation subsystem 18 communicates scanning compensation data to a high speed focusing control subsystem 21 which may include a high speed emitter focusing control subsystem 22 (hereinafter simply "emitter focusing subsystem" 22), as well as a high speed detector focusing electronic control subsystem 24 (hereinafter simply "detector focusing subsystem" 24). The emitter focusing subsystem 22 generates control signals. Emitter focusing subsystem 22 and detector focusing subsystem both communicate bidirectionally with an emitter/detector steering subsystem 26, which generates one or more laser beams at a scene or object being imaged and receives back reflected optical signals from one or more objects in the scene being imaged.

The emitter/detector steering subsystem 26 may include one or more lasers 28 and a detector 30 having a photodiode array 30a comprised of one or more light sensors, which in this example are in the form of photodiodes. For convenience, the laser 28 will be described as generating a single laser beam, although the present disclosure may just as readily be used with a plurality of independently controllable lasers that generate a corresponding plurality of laser beams. If a plurality of independently lasers are used, the beams may be of a common wavelength, or different wavelengths, each possibly selected based on providing optimal reflectance from specific types of objects (e.g., foliage, metal, plastic, human tissue, etc.). Both types of implementations are envisioned by the present disclosure.

The emitter/detector steering subsystem 26 may also include an optics subsystem 31, and a digital micromirror assembly 32. The digital micromirror assembly 32 may have a plurality of independently, digitally controllable micromirrors 34 which can be used to reflect the entire laser beam 36 generated by the laser 28, which passes through an optics subsystem 35 prior to reaching the micromirrors 34, through an optics subsystem 32a toward a scene being viewed. The digital micromirror assembly 32 also operates to reflect received light signals back to the detector 30 through the optics subsystem 31. In this regard, it will be appreciated that one group of the micromirrors 34, for example indicated by reference number 34a, functions as an "emitter array" to control the direction of emitted light from the laser 28 toward the scene being imaged laser, while a different group of the micromirrors 34, for example designated by reference number 34b, may function as a "detector array", which may be used to reflect received light signals into the detector 30. In one implementation the digital micromirror assembly 32 uses individual ones of the micromirrors 34 or subgroups of the micromirrors 34 to reflect different portions of the laser beam 36 (or even separate laser beams if more than two lasers are being used) toward two or more selected subregions of the scene being imaged, or toward two or more specific objects 37 in the scene, and to reflect received optical signals 36a from the two or more subregions and/or objects back into the detector 30. The digital micromirror assembly 32 thus makes it possible to closely image and/or track two or more subregions or objects within a given scene simultaneously in real time. An additional benefit of this high level of focusing ability provided by the digital micromirror assembly 32 is the ability to improve data collection in areas of value, providing data with much higher value than what would be collected from a single laser beam being raster scanned across an entire scene. This adaptive capability enables much more efficient use of the mechanical bandwidth available from the system 10 by examining data generated from specific selected portions or objects within a scene, rather than the entire scene. This important advantage will be described further in the following paragraphs.

The digital micromirror assembly 32 also collects reflected optical energy back from the scene being imaged, or from specific subregions or objects within the scene, and provides data corresponding to the received optical signal to the detector 30. Again, the detector 30 may be a single light detector or an array of independent light detectors, with one embodiment shown in FIG. 1 having the photodiode array 30a. The emitter/detector subsystem 26 reports the collected data back to the controller 12 which uses the lidar control software 16 to interpret the data and to decode and/or generate information on exactly what objects, and their respective distances from the vehicle, are present within the scene being imaged.

One possible configuration of the arrays 34a and 34b of the digital micromirror assembly 32 is rather to use a single array for both emission and detection steering, so they are using a common window. This requires a means to separate the returning light from the emitted light, which is done generally in one of two ways. In the first way, the apertures are of significantly different size, so one can form a small part of another while being co-aligned. For example, the laser beam 36 is reflected off a small mirror at the center of the collection aperture. Unfortunately, for MEMS, the aperture size is the major cost factor, and the performance scales by the product of the two apertures, emitter and receiver. So mismatching the size reduces performance while increasing cost. Matching the aperture sizes provides the highest return signal capture for the lowest cost. In the second way, a beamsplitting optic is used to partially reflect some of the return beam to the detector. The ideal beamsplitting value is generally roughly 50:50 splitting. Unfortunately, this attenuates the outgoing signal and the return signal, meaning approximately 4× the power is required. The increased power directly raises the cost of the emitter. From a practical view, the stray light from putting both onto a common array and having both go through a common window causes significant technical challenges. This is because even the fractional stray light returns from the shared optical path are often enough to swamp the detector reading, since it can be around six orders of magnitude lower than the emitted pulse. There will be windows, one on the mirror chip and one on the housing, and the external faces of the housing window will never be free of scattering objects. A separate window and optical path for emission vs detection avoids this signal cross-talk and lowers emitter power demands and sensor performance demands. The shared window can be implemented but another system using separated arrays/windows will win on cost hence margin, simplicity, manufacturability and performance. So while the present adaptive lidar system 10 may operate with a common array and window, one preferred layout is with separate arrays and windows.

The emitter and detection arrays 34a and 34b may have additional optical elements (31, 35, 32a) including lenses, angle magnification elements and area magnification elements placed before or after them. It is generally best practice to use a similar set of optics for both arrays, so they have matched optical capabilities (angular range, etc.) in order to do parallel tracking. For instance, angle magnifying lenses may be placed in front of both (32a) to increase the angular throw of the lidar system 10. This has the effect of increasing resolution and beam size on target, but the tradeoff may be worth it in many cases.

The system 10 provides the advantage that the light detecting sensor 30 may be operated in an adaptive mode by using different ones of the micromirrors 34 of emitter array 34a to control steering of the beam(s) from the laser beam 36 as well as to selectively direct different ones of the received (i.e., reflected) light signals back into the detector 30. In general, it would be desirable to match the array size of the micromirrors 34 used with the detector array 34b to the array size of the micromirrors 34 used with the emitter array 34a to emit the laser beam 36, so as to have a 1:1 mapping for laser 28 (i.e., the emitter) and the detector 30, but this is not strictly required. For example, the detector array 34b could be made larger than the emitter array 34a to capture more return light. The detector array 34b, or just a portion thereof, may then be steered to capture returns from any given area in the field-of-view, or possibly two or more given areas simultaneously. This ability to focus on a single spot will significantly reduce noise by rejecting light from all other directions but will produce a small targeted field of view for each sensor of the detector 30. The detector 30 adaptively maps the incoming light 36a to a plurality of photodiodes within it by the use of a pixel allocation digital micromirror array 30b inside the detector 30. This process is described below. The detector array 34b could be slaved so that the detector array 34b effectively "tracks" the emitter array 34a, producing an optical imaging system that is both emitting to a particular direction and only sensing in that particular direction. The benefit of this configuration is significantly reducing interference in the detector 30, thus significantly improving the signal-to-noise ratio. It may be desired to slightly delay the pointing of the detector array 34b by the expected transit time of the light pulse, which can be around 1 μs for 200 m ranged targets. The delay ensures that when the pulse returns, the detector array 34*b* is directly facing that point rather than having moved on to point elsewhere. The alignment of the detector array 34*b* to the incoming pulse ensures the highest sensitivity to the return pulse. If higher sensing capability is desired for a particular beam, multiple detector array 34*b* micromirror elements could be pointed at the same angle to proportionally increase the captured signal. Likely, leaving each detector array 34*b* micromirror 34 steering element slaved to a corresponding emitter array 34*a* micromirror element will still provide good performance, as the increase in signal would also be generally accompanied by pointing more of the emitter array 34*a* micromirror elements 34 at the point of interest too. In general, the detector micromirror array 34*b* and the emitter micromirror array 34*a* act to bring a particular area of the field-of-view into regard by the lidar system 10, similar to a laser telescope and sensor telescope working in parallel to focus on a spot. The emitter/detector steering subsystem 26 then bounces a laser beam 36 off the object in that area, and gets a return signal 36*a*. By approximately slaving the detector 34*b* and emitter 34*a* micromirror arrays together, the system 10 is able to maximize the signal-to-noise ratio even if the beam is split and measurement is parallelized by scanning with multiple separate output beams. This is because the signal-to-noise is approximately driven by the product of the emitter area and the detector area, so the highest product for the least number of mirrors is to have the two aperture sizes equal. The acceptance angle of each detector array 34*b* micromirror element 34 could be made slightly wider than the expected emitter beam (i.e., beam 36) size so as to still capture the full emitted laser beam signal, even if the emitter array 34*a* and detector array 34*b* are slightly misaligned. This acceptance angle parameter would be largely constrained by the design of the detector 30, described below. However, the tradeoff is that the larger this acceptance angle is, the higher the background noise is likely to be.

Figure 3:
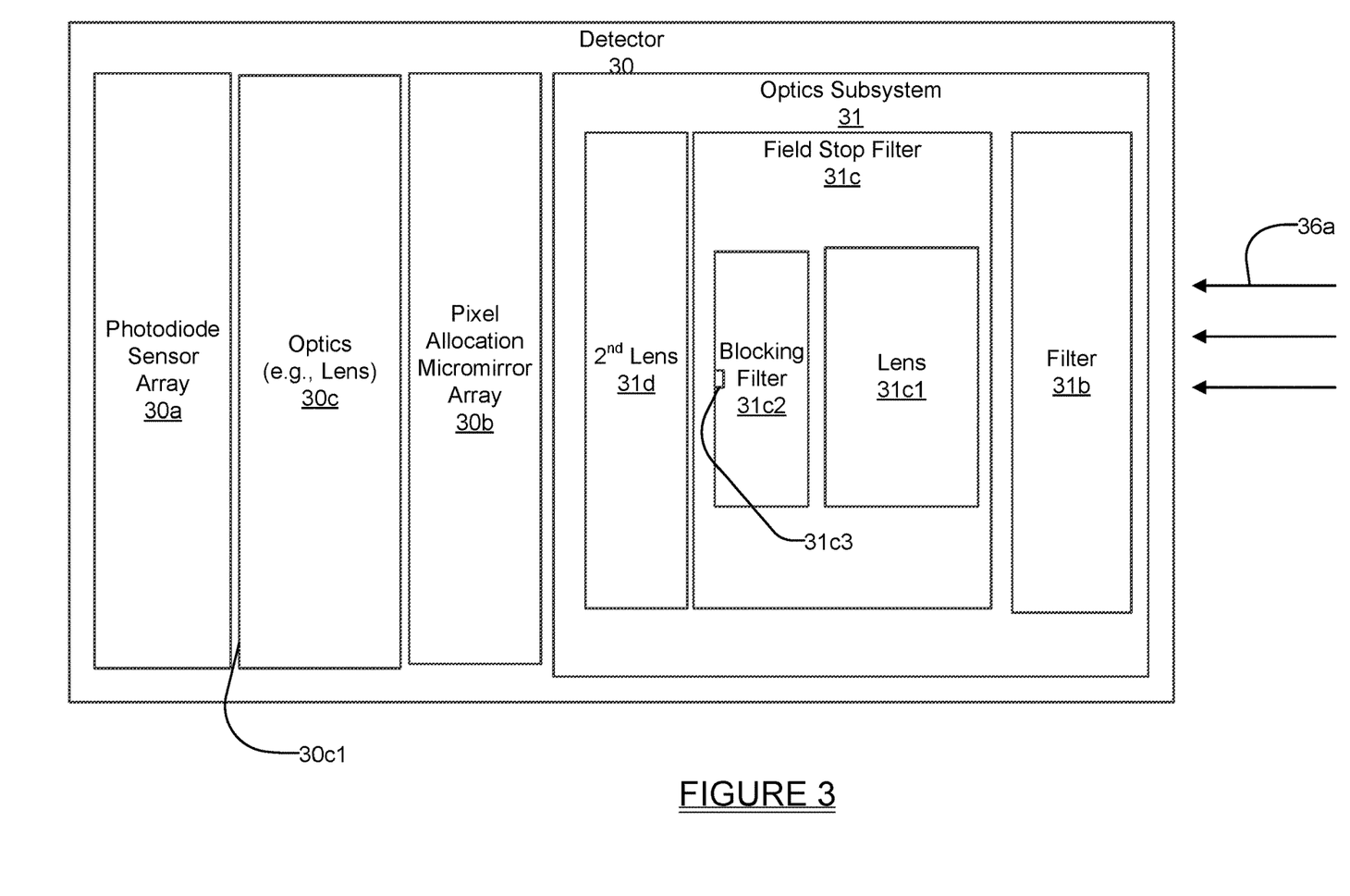
FIG. 3 is a high level block diagram of one example of a construction of the detector.

The detector 30 maps the light captured by the detector micromirror array 34*b* to the photodiodes of the photodiode sensor array 30*a* within it. It is often desired to use a small photodiode with the highest possible signal on it to improve signal collection capability. This requires that all light 36*a* being received from a specific pulse be focused down to a single area that may be smaller than the size of the steering mirrors in the digital detector micromirror array 34*b*. The size of the diode controls noise for some types of diodes (PIN), and the detector 30 response time, which is important for observing short nanosecond scale pulses characteristic of lidar returns. Each independent beam sent out by the lidar unit emitter/detector steering subsystem 26 will generate a return pulse, which will be captured by the corresponding slaved section of the detector micromirror array 34*b*, and all the return signal associated with that pulse should be focused to a single photodiode pixel (i.e., one of the photodiodes in the photodiode sensor array 30*a* in FIG. 1) if possible to minimize noise. However, minimizing noise presents two difficulties. First, the distribution of the detector micromirror array 34*b* area is adapting rapidly to capture the returns from one or more emitted beams so it cannot be predetermined. The layout of the light directing systems 31 and 30*b* within the detector 30 to focus the incoming light 36*a* to the photodiodes 30*a* must then also be adaptive. Second, there is an issue of environmental background noise including stray pulse returns from other nearby lidar units pulled in by the sensors. It is desired that the detector sensors (i.e. photodiodes of the photodiode sensor array 30*a*) only receive light from each mirror in the detector array 34*b* corresponding to the direction of interest that the mirror is pointing. However, mirrors will also pass light into the system from all other angles, which can get read in to the photodiodes 30*a* of the photodiode sensor array 30*a* causing environmental noise, if not filtered out. This is a particular issue with solar reflection or sensor crosstalk if other lidar units are operational in the area, as would be expected for self-driving cars operating in near vicinity to one another. The desired return pulse light is all leaving the emitter/detector steering subsystem 26 detector micromirror array 34*b* as a parallel set of beams 36*a*, while the unwanted light will be reflected off the mirrors at non-zero angles corresponding to other locations in the field of view. There is therefore a need to filter this off-axis light for both the wavelengths of interest and to remove the unwanted environmental noise returns. The design in FIG. 3 shows one way both of these goals may be accomplished. The signal 36*a* from the digital micromirror assembly 32 is fed into the detector 30. First, the light is filtered by a filter 31*b* to reduce returns corresponding to wavelengths other than the wavelengths used by the lidar system 10. Second, a standard field stop filter 31*c* is used to block the angular component of the captured light. This can work by using a lens 31*c*1 to focus the light to an image plane. A blocking filter 31*c*2 is placed on the image plane, and a small hole 31*c*3 is cut in the filter corresponding to the point at which the desired light signal 36*a* will focus. The hole 31*c*3 may be made in several ways including through solid material or with a silvering on the surface of a transparent plate. In the case of the reflective surface coating, the edges of the hole 31*c*3 could be made partially transmissive, which would allow slightly misaligned light to pass through, attenuated. The partial attenuation would help the detector array align to the emitter array, as compared to a binary mask. All light leaving the detector micromirror array 34*b* at undesired angles will get mapped to other locations on the focal plane, and be blocked by the filter 31*c*2. A second lens 31*d* returns the light back to a roughly collimated beam, which is pointed at the internal pixel allocation micromirror array 30*b*. The lenses may additionally be used in a standard image transfer setup where the detector micromirror array 34*b* is considered the input image plane. The lenses would then pass the image through the pinhole filter 30*c*2 and reimage it to the pixel allocation micromirror array 30*b*. This is often done with a 4-*f* optical setup, which does not magnify the image. While the pixel allocation micromirror array 30*b* does not need to be the same array size as the detector micromirror array 34*b*, it is generally best practice and the most flexible layout to make them equal. Then each mirror on the detector micromirror array 34*b* is mapped to a mirror on the pixel allocation micromirror array 30*b*. The pixel allocation micromirror array 30*b* takes the collimated light incident on it and distributes that light to the array of photodiodes of the photodiode sensor array 30*a*, which record the light pulse. The distribution process is carried out by steering the light through a lens 30*c* which maps angle to displacement of the focal point on the image plane. In this example the detector sensor array 34*b* is located on the image plane 30*c*1 of the lens 30*c*, so as the mirrors on the pixel allocation micromirror array 30*b* change the emitted angle of the light, that light focuses down to a different spot on the photodiode sensor array 30*a*. The benefit of using the lens 30*c* is that the focal point on the photodiode sensor array 30*a* is much smaller than the beam size at the pixel allocation micromirror array 30*b*. This allows for smaller detector sensor pixels to be used, which reduces sensing noise and reduces sensor response time. Each emitted beam 36 will generally have one pixel used to capture the return pulse 36a to minimize noise, so the photodiode array 30a is sized largely by the expected degree of parallelization. It is expected that a small array of <10 photodiodes are generally sufficient.

The system 10 provides a fully adaptive lidar system having the ability to switch between different sensing modes as needed, and as controlled by one or more algorithms included in the lidar control software 16. The lidar control software 16, in connection with the controller 12, may determine how to split up the emitter array 34a and detector array 34b pointing capabilities between a plurality of different possible modes, those being, for example, the low resolution mode implemented by low resolution subsystem 16a, the high resolution scanning subsystem 16b and the tracking mode subsystem 16c. As noted above, multiple modes may be simultaneously driven by different sections of the arrays 34a and 34b, or the arrays might be used sequentially, where the entirety of each array 34a and 34b is dedicated to one mode of operation at a time.

The system 10 also compensates for, and cancels out, platform motion of the platform (e.g., vehicle) which it is being used with. By this it is meant that the system 10 can be controlled such that the pointing angle assigned to the emitter array 34a accounts for and cancels out motions of the platform, such that the laser default pointing angle remains largely constant as seen in the frame of view of the environment around the platform during the time of the scan. The compensation ensures that the point cloud data collected by the lidar unit is not distorted by sudden mid-scan orientation changes in the platform. Such distortions map into the 3d point cloud data, distorting it and changing the shape, location or even existence of objects in the collected image. The angular distortion issue is amplified by range, and can significantly lower the quality of long range data. Compensation in data collection allows for crystal clear images despite vibration and jolting occurring on the platform, the platform is whether it is a drone, passenger automobile, truck, aircraft or even an individual. The compensation could be enabled during a particular step, for instance a high-resolution area scan, so that the vehicle maneuvering does not show up as a distortion in the point layout. One possible method of operation is to determine the expected vehicle orientation, then use accelerometer data, which may be included in the sensor data 20, to measure high frequency variation from that orientation, and send high frequency signals to the arrays 34a and 34b to cancel out the platform orientation variation, so the laser remains pointed in the desired direction in the global frame of reference. This would maintain the emitter and detector arrays 34a and 34b pointing the beam 36 along the desired nominal axis even during shocks or bumps, but would keep them in line with the vehicle during low frequency turns, as the low frequency variation is allowed to pass uncompensated. The goal is to produce an image of the surroundings as if the platform were stationary during the period of the scan. It is important that the lidar system 10 be able to maintain the orientation at the start of the measurement, then use this as the reference frame for orienting the image processing algorithms to the collected data. The adaptive compensation provided by the system 10 cancels out high frequency issues. The largest remaining error is the known vehicle motion. The known vehicle motion can be removed by adding a vector to each point in the point cloud returns that corresponds to (and removes) the vehicle's motion since the start of the scan up to the time of that particular point's collection. Most scans will generally be a fraction of a second ($\frac{1}{10}$s), so the vehicle can generally be modeled as under relatively simple kinematics during that period. For instance, a uniform acceleration and initial velocity can be applied to clean up lidar images collected during a time period where the vehicle is braking. Between measurement steps, the compensation could be halted as required so the lidar pointing angle of the arrays 34a and 34b would be realigned with the nominal direction of the vehicle. Deliberate maneuvering of the vehicle could be passed to the scanning compensation system 18 to modulate the nominal axis, so the emitter and detector arrays 34a and 34b are always pointed towards the expected direction of travel of the vehicle without any low pass filter lag.

The system 10 provides a fully adaptive emission and detection system which can switch between modes as needed by the image lidar control software 16 working in connection with the controller 12. The lidar control software 16 and controller 12 may be used to determine how to split up the pointing capabilities of the digital micromirror assembly 32 between the different possible imaging modes. The system 10 may also operate in several modes, including, but not limited to, the low resolution scanning mode implemented by low resolution scanning subsystem 16a, the high resolution scanning mode implemented by high resolution scanning subsystem 16b, and the focused tracking mode implemented by tracking mode subsystem 16c. Multiple modes may be simultaneously driven by different sections of the emitter and detector arrays 34a and 34b, or the entire array formed by digital micromirror assembly 32 might be used sequentially, where the whole array is dedicated to one mode of operation at a time, and possibly then at some point in time, carrying out higher resolution scans, and/or enabling focused tracking on a single detected object in the scene being imaged.

Low Resolution Scanning Mode

The low resolution scanning mode implemented through the low resolution scanning subsystem 16a may provide "rough" detection of objects. The scans implemented in this mode of operation can be progressive, so over longer periods of time all of the space in a given imaged scene is covered. But on any given scan, the area covered by the scan may be laid out to allow for large gaps between the measured points. This provides a rough area measurement, checking for objects within the range of interest. The defocus control subsystem 26 may also adaptably defocus the laser beam 36 slightly during the low resolution scan operation, so the laser beam is likewise wider, ensuring that no objects can slip between low resolution scan grid points. Such defocus could be done with a high speed electronic focus control subsystem 28a, such as a liquid lens.

High Resolution Scanning Mode

The higher resolution mode implemented using the high resolution scanning subsystem 16b can be performed to cover areas of anticipated high value, identified either by their location in the field of view (such as the road directly ahead or around a turn for a car) or by previous scan data, which indicates a possible unexpected return. Such areas are identified by the lidar control software 16, then assigned a higher value by the software 16, and then passed to an active high mechanical bandwidth steering mirror or emitter/detector array combination (i.e., selected portions of arrays 34a and 34b) to do a focused study within. This acts similarly to the human eye, where the area of interest is studied with high resolution imaging, while low resolution image capture is used outside of this region to provide a means of determining where focus should next be applied. In this method, multiple areas of high value, or values of different scale could be applied, and the mirror controllable motion shifted between these areas to ensure coverage of the important areas. This would allow an unexpected return of a low resolution mapping effort to be quickly studied in high resolution detail, while the area all around is left at low resolution. The effect of such adaptability is to increase the quality of the incoming data, providing only information in areas of expected value, rather than a vast torrent of generally uninformative points of data.

Such adaptable scanning could may be carried over to a multi-wavelength mode, where different laser wavelengths in a single or set of emitter/detector devices are given a value map, for example assigned by the Lidar control software 16, for their respective fields of view. For instance, a laser which has high reflectivity off of vegetation may be tasked with scanning the sides of the road ahead, but avoiding wasting time imaging the road directly ahead and below. This layout would be changed/controlled in accordance with direction of the road as the road turns. Likewise, a laser optimized for pavement or vehicle return would be tasked mainly with looking at the road ahead and below. Different wavelengths are known to work better or worse in different weather conditions, so the value map contained in the Lidar control software 16 may be adjusted as weather conditions change, for example based on real time weather data supplied from an external weather information source 38 as shown in FIG. 1. For example, during poor weather, the clear weather laser may be essentially drawn down to general low resolution mapping or even turned off, but the poor weather laser system scaled up to full bandwidth, full scale mapping. This would allow for the system 10 to trim out low quality data, reducing the data load on image processing algorithms used in the Lidar control software 16 and thus substantially improving the overall response rates for the subsystems 16*a*, 16*b* and 16*c*.

The mode of imaging can even be shifted to go from image generation to tracking via dithering, using the tracking mode subsystem 16*c* shown in FIG. 1, around a particular reflection in order to find the center of that return signal. This allows for very high bandwidth tracking of an individual object, such as the taillight of a car in the road ahead. The high bandwidth non-imaging operation may bypass the image processing algorithm portion of the lidar control software 16, and may do so with high resolution position information (due to the continuous lock-on), reducing the noise and latency of velocity or acceleration readings on the objects in the field of view. This capability is valuable for autonomous vehicles in emergency situations where events are occurring at high speed, and precise accelerations must be known to determine maneuvering plans.

Figure 2:
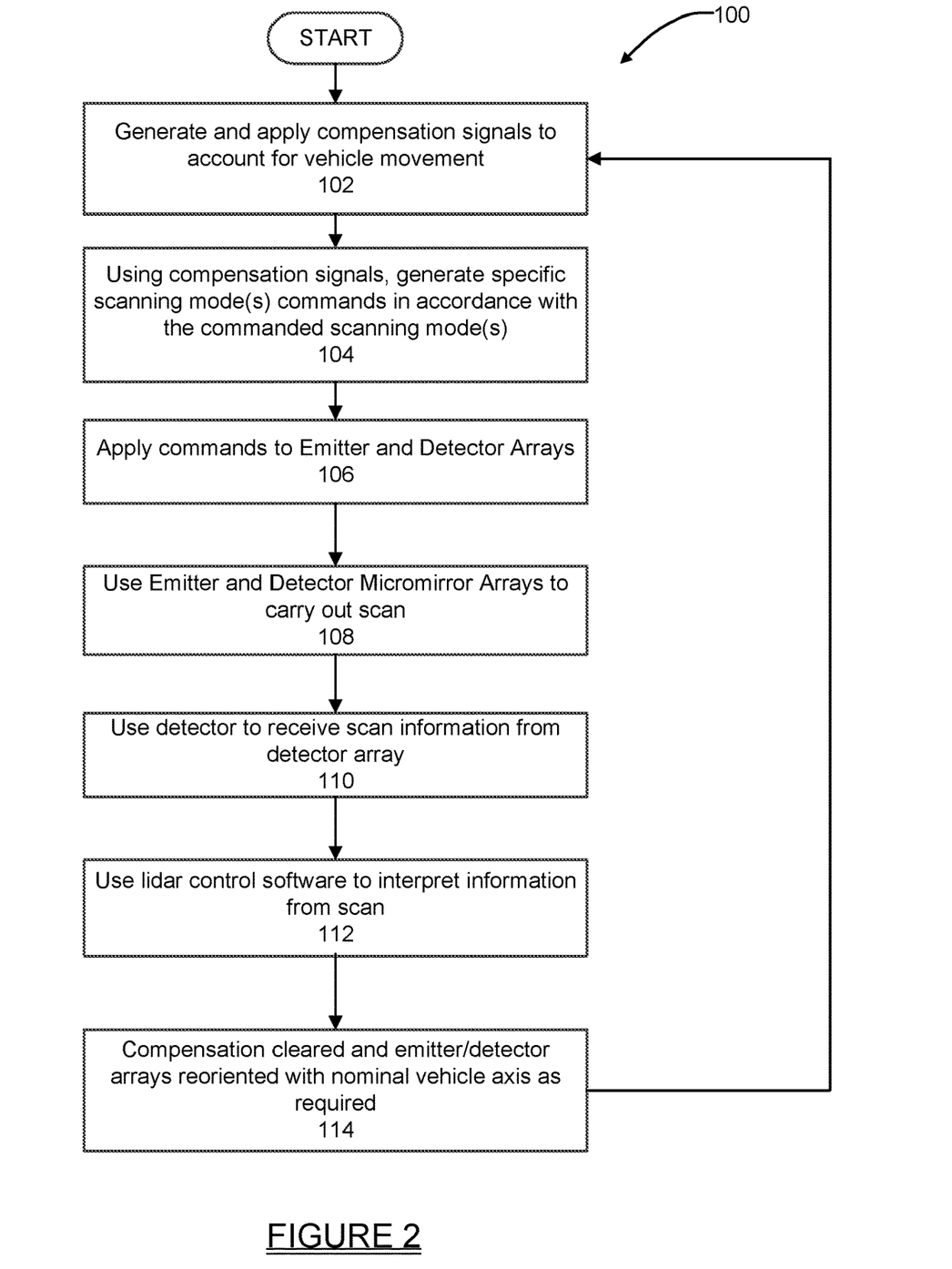
FIG. 2 is a high level flowchart setting forth a plurality of operations that may be performed by the system shown in FIG. 1.

Referring to FIG. 2, a high level flowchart 100 is shown illustrating basic operations that the system 10 may carry out in performing its various scanning modes. At operation 102 the compensation signals are fed into the controller 12 to account for movement/motion of the vehicle (i.e., brief sudden elevation changes, yaw, pitch, roll, etc.). At operation 104, using the compensation signals, the lidar control software 16 and the controller 12 generate specific scanning mode(s) commands in accordance with the commanded scanning mode(s). At operation 106, the scanning mode commands are transmitted to the emitter/detector subsystem 26. At operation 108 the emitter and detector arrays 34*a* and 34*b* are controlled to carry out the commanded scanning operation. At operation 110 the detector 30 is used to receive the reflected optical signals from the detector array 34*b*. At this operation, preferably the internal pixel activation array may be modified to direct each of the independent returning signals to an independent sensing pixel within the detector 30.

At operation 112 the lidar control software 16 interprets the data received from the emitter/detector subsystem 26 for the just-completed scan. At operation 114 the compensation values may then be cleared, and the emitter and detector arrays 34*a* and 34*b* reoriented with the nominal vehicle axis as required, in preparation for the next commanded scan.

The various embodiments of the system 10 described herein thus provide a number of important advantages over previously developed lidar systems. A particularly important advantage of the system 10 is that the system 10 can be commanded to capture only data pertaining to specific subregions of a scene and/or specific detected objects within a scene, and the system 10 can be dynamically controlled in real time to adjust to imaging other subregions and/or objects. This can dramatically reduce the data required to be analyzed by the Lidar control software 16.

The system 10 provides the benefits of high resolution limited only by the scanning mirrors pointing stability (<0.001° or 20 µrad) mapping but without the data handling and bandwidth usage issues that otherwise rise with such high resolution scanning. The system 10 enables objects to be seen and detected well before previously developed lidar systems are able to due to the capability to provide extra measurements for increased range in certain areas, which enables the system 10 to detect vehicle tail-lights, and other relatively small yet highly important objects, which other sensors would have extreme difficulty detecting or simply be unable to detect in the short time needed for real world applications. This makes the system 10 especially adept at anticipating possibly rapidly developing and hazardous situations in real traffic/travel conditions.

The system 10 also provides range and rate adaptability advantages over previously developed lidar systems. The system 10 is able to focus one or more lasers to the same point for increased range, for example when dealing with dense weather making for limited visibility (e.g., drizzling rain and/or fog), or trying to locate a spurious signal, as well as averaging out multiple received signals for even finer detection resolution, or spreading emitted beams all around for even more rapid image generation that what would be possible with previously developed Lidar system.

The system 10 can dynamically adjust between longer distance, stronger beam (combined mirrors from the detector array 34*b*) or rapid imaging (split the emitted beams using the emitter array 34*a*) to adapt to vehicle requirements (weather, obstacles or other issues ahead in the projected path of travel). The system 10 can use its dithering subsystem 16*d* to dwell at specific selected points to capture even higher quality signal data for longer range if desired, with a tradeoff of data rate for quality.

The tracking mode subsystem 16*c* of the system 10 enables the system to obtain high density data focused continuously at an area ahead of the vehicle, even during turns, and automatically modifies the area of focus, such as up and down curved and/or undulating roads, where previously developed lidar systems would typically suffer significantly degraded (or possibly a total loss of) imaging capability. The system 10 further enables wide or detailed imaging, to produce a fine map of object for easy identification, find high reflectivity retroreflectors (e.g. taillights) for excellent real time distance measurements, even in poor visibility conditions. Advantageously, the system 10 is able to ignore areas of little interest, for example to take only limited or sparse readings (e.g., close to the vehicle at speeds, or possibly far to sides of the vehicle), in order to provide just enough imaging data to identify if an object of interest may exist in such locations, and then can initiate a more focused scan using its high resolution scanning subsystem 16b, or its tracking mode subsystem 16c, or other subsystems 16d for additional scan data if the system 10 chooses.

From a practical performance standpoint, the system 10 makes far more effective use of the obtained data, and a greater than 10× increase in the speed of object acquisition and assessment by the system 10 is possible. The system 10 further enables increased dynamical mode adaptability and the ability to generate 1d or 2d images as required by a given situation for the best tradeoff/balance between data quantity and collection time. The system 10 may further be used to shift imaging a single point in the scene, and held on target on the single point, for continuous clean reads, or possibly dithered back and forth over for clean, strong reading, which enables the system 10 to become a dedicated object channel for high resolution, real time distance measurements. This capability enables the system 10 to implement a single dedicated scanning channel per vehicle taillight, which can provide object orientation, velocity and, acceleration, with no complex math being required for measurements. This helps the system 10 to operate with extremely low latency in certain conditions, which is highly valuable in critical situations, such as where another object or vehicle travelling ahead and being imaged by the system 10 makes a sudden braking action. The direct lock-on to another vehicle that would occur during tracking could be used to generate a free-space optical communications link, if the other vehicle has a similar system that is able to see the incident laser. The lidar system 10 would need to have the ability to use the laser as a communications link, which might be done by including a low cost, short range pulsed communications laser diode in the laser 28. For instance, it is expected that lidar units would go in or around the taillights, which make for excellent tracking targets. A vehicle approaching from the rear might switch to tracking as it gets close, lock in to a taillight, and send a warning signal to the vehicle ahead of it (through the taillight lidar unit) to try and accelerate to avoid collision. This ad-hoc network could be useful for cars to warn one another of impending collision.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure;

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An adaptive light detection and ranging (lidar) system, comprising:
 a controller;
 lidar control software in communication with the controller;
 a focusing control subsystem configured to control focusing and detection of a laser beam;

an emitter/detector subsystem including a micromirror assembly including a plurality of micromirrors and a detector, the emitter/detector subsystem being responsive to commands from the focusing control subsystem to generate at least one laser beam which is used to implement a plurality of different scanning modes for imaging a scene;

the micromirror assembly configured to perform both transmitting of the laser beam toward the scene and reception of reflected light back from one or more objects in the scene during the different scanning modes using first and second different subpluralities of the micromirrors;

the micromirror assembly further configured to form first and second independent transmitting channels to propagate at least a pair of optical signals into the scene using select ones of the first subplurality of micromirrors, and first and second independent receiving channels using select ones of the second subplurality of micromirrors to receive at least a pair of reflected optical signals back from the scene and to reflect the at least a pair of reflected optical signals therefrom toward the emitter/detector subsystem;

the emitter/detector subsystem further being configured and disposed relative to the micromirror assembly to receive the at least a pair of reflected optical signals from the micromirror assembly;

wherein the plurality of different scanning modes includes at least two different scanning modes, each selected by the controller, and executed simultaneously by the emitter/detector subsystem using the first and second independent transmitting channels and the first and second independent receiving channels, wherein the scanning modes relate to at least one of different scanning patterns or different scanning resolutions employed simultaneously using the first and second independent transmitting channels and the first and second independent receiving channels;

wherein only the reflected light reflected back from the scene is used in implementing the first and second independent receiving channels; and wherein the emitter/detector subsystem further includes a pixel allocation micromirror disposed upstream of the detector, relative to the reflected light received by the micromirror assembly, and having an array of mirrors which are mapped to specific ones of the plurality of micromirrors on the micromirror assembly for steering light received from the plurality of micromirrors to specific pixels forming an image plane of the detector.

2. The system of claim 1, wherein the emitter/detector subsystem is controlled by the lidar control software to implement the at least two different scanning modes, and wherein the two different scanning modes include a low resolution scanning mode in addition to a high resolution scanning mode, and wherein the second independent transmitting channel and the second independent receiving channel are used to focus on a specific object in the scene in accordance with the high resolution scanning mode, while the first independent transmitting channel and the first independent receiving channel are used to implement the low resolution scanning mode to scan a different portion of the scene.

3. The system of claim 1, wherein the emitter/detector subsystem is controlled by the lidar control software to implement a tracking mode wherein a portion of the at least one beam is continuously focused on an object in the scene.

4. The system of claim 3, wherein the emitter/detector subsystem includes a micromirror assembly which is controlled to simultaneously use portions of the laser beam to implement the tracking mode and a low resolution scanning mode, thus simultaneously focusing on different areas of the scene.

5. The system of claim 1, wherein the emitter/detector subsystem is controlled by the lidar control software to implement a tracking mode by using a dithering operation wherein a portion of the at least one beam is dithered around a specific object in the scene.

6. The system of claim 5, wherein the micromirror assembly is controlled to simultaneously dither the at least one beam while also implementing a low resolution scanning mode, to simultaneously focus on different areas of the scene.

7. The system of 1, wherein the emitter/detector subsystem includes:
a detector for receiving optical signals reflected from objects in the scene; and
a laser for generating the at least one laser beam.

8. The system of claim 7, wherein the micromirror assembly comprises a digital micromirror assembly.

9. The system of claim 8, wherein the plurality of micromirrors are grouped into at least one emitter array and at least one detector array.

10. The system of claim 1, further comprising a scanning compensation subsystem for generating compensation information to account for at least one of elevation changes, roll, pitch or yaw of a vehicle carrying the system, which said scanning compensation subsystem is used by the emitter/detector subsystem in scanning the scene.

11. The system of claim 1, wherein the focusing control subsystem comprises:
an independent high speed emitter focusing subsystem for generating signals used in controlling a direction of scanning of the laser beam; and
an independent high speed detector focusing control subsystem for generating signals used in controlling a viewing direction for reflected optical signals from one or more objects in the scene.

12. The system of claim 1, wherein the controller is configured to receive real time weather information from a remote weather source for use with the lidar control software.

13. The system of claim 1, wherein the emitter/detector subsystem includes a defocus control subsystem responsive to the controller for defocusing the laser beam to increase an area of the scene being imaged by the laser beam.

14. An adaptive light detection and ranging (lidar) system, comprising:
an electronic controller;
a memory;
lidar control software contained in the memory and in communication with the controller;
a focusing control subsystem in communication with the electronic controller and configured to control focusing and detection of a laser beam; and
an emitter/detector subsystem in communication with the electronic controller and responsive to commands from the focusing control subsystem to generate at least one laser beam from at least one laser, which is used to implement a plurality of different scanning modes for imaging a scene, wherein the scanning modes relate to at least one of different scanning patterns or different scanning resolutions employed simultaneously;

the emitter/detector subsystem including a detector and a digital micromirror assembly having a plurality of independently, digitally controllable micromirrors for controlling pointing of the at least one laser beam as the at least one laser beam is emitted toward the scene, to use a first subplurality of the micromirrors to form first and second independent transmitting channels to illuminate two different subregions of the scene simultaneously, and to use a second subplurality of the micromirrors to form first and second independent receiving channels to receive reflected optical signals from the two different subregions of the scene simultaneously to implement the plurality of different scanning modes, and to reflect the received, reflected optical signals therefrom using the first and second independent receiving channels toward the emitter/detector subsystem;

the emitter/detector further being configured and disposed relative to the digital micromirror assembly to receive the received, reflected optical signals from the digital micromirror assembly;

wherein the received, reflected optical signals are formed only from light reflected back from the two different subregions of the scene, and used in imaging the scene; and wherein the emitter/detector subsystem further includes a pixel allocation micromirror disposed upstream of the detector, relative to the reflected optical signals received by the digital micromirror assembly, and having an array of mirrors which are mapped to specific ones of the plurality of independently, digitally controllable micromirrors for steering light received from the digital micromirror assembly to specific pixels forming an image plane of the detector.

15. The system of claim 14, wherein the focusing control subsystem includes:
a high speed emitter focusing control subsystem for controlling pointing of the laser beam from the at least one laser; and
a high speed detector focusing control subsystem for controlling a direction of view when receiving optical signals reflected from one or more objects in the scene.

16. The system of claim 14, further comprising a scanning compensation subsystem to account for at least one of vehicle roll, pitch, elevation change, and yaw, the scanning compensation subsystem used by the focusing control subsystem to modify the commands being applied to the emitter/detector subsystem to account for changes in orientation of a vehicle on which the system is employed.

17. The system of claim 14, wherein the lidar control software includes modules for implementing the plurality of different scanning modes, and wherein the plurality of different scanning modes includes two or more of:
a low resolution scanning mode of the scene;
a high resolution scanning mode focused on a subregion of the scene; and
a tracking mode which dithers an optical signal around a selected object within the scene.

18. The system of claim 14, wherein the electronic controller is configured to receive real time weather information and use the received real time weather information in controlling the laser beam emitted from the emitter/detector subsystem.

19. An adaptive light detection and ranging (lidar) method comprising:
using a focusing control subsystem configured to control focusing and detection of a laser beam; and using an emitter/detector subsystem having a detector and a digital micromirror assembly responsive to commands from the focusing control subsystem to generate at least one laser beam and to use a first subplurality of micromirror elements to scan the at least one laser beam toward a scene to illuminate the scene;

using the digital micromirror assembly of the emitter/detector subsystem to also simultaneously receive optical signals reflected from the scene in response to the scanning of the at least one laser beam by using a second subplurality of the micromirror elements, different from the first subplurality of micromirror elements, to receive the reflected optical signals from the scene;

and where the first subplurality of micromirror elements is further configured to form first and second independent transmitting channels, and the second subplurality of elements is further configured to form first and second independent receiving channels, the first and second independent receiving channels and the first and second independent transmitting channels further configured to operate simultaneously, and wherein the first and second independent receiving channels require use of only the reflected optical signals reflected back from the scene;

using the first and second independent transmitting channels and the first and second independent receiving channels to implement to different scanning modes relating to at least one of different scanning patterns or different scanning resolutions employed simultaneously;

using the emitter/detector subsystem to receive the reflected optical signals reflected back from the scene via the digital micromirror assembly, using the first and second independent receiving channels; and wherein the emitter/detector subsystem further includes a pixel allocation micromirror disposed upstream of the detector, relative to the reflected optical signals received by the digital micromirror assembly, and having an array of mirrors which are mapped to specific ones of the digital micromirror assembly for steering light received from the digital micromirror assembly to specific pixels forming an image plane of the detector.

20. An adaptive light detection and ranging (lidar) system, comprising:
a controller;
lidar control software in communication with the controller;
a focusing control subsystem configured to control focusing and detection of a laser beam;
an emitter/detector subsystem including a first micromirror assembly including a plurality of micromirrors, the emitter/detector subsystem being responsive to commands from the focusing control subsystem to generate at least one laser beam which is used to implement a plurality of different scanning modes for imaging a scene;
the emitter/detector subsystem including a detector and a second micromirror assembly having an additional plurality of micromirrors, and configured to receive reflected light back from one or more objects in the scene during the different scanning modes using selected ones of the additional micromirrors;
the first micromirror assembly further configured to form first and second independent transmitting channels to propagate at least a pair of optical signals into the scene using select ones of the subplurality of micromirrors, and first and second independent receiving channels using select ones of the additional subplurality of micromirrors of the second micromirror assembly to receive at least a pair of reflected optical signals back from the scene and to reflect the at least a pair of reflected optical signals therefrom toward the emitter/detector subsystem;

the emitter/detector subsystem further being configured and disposed relative to the second micromirror assembly to receive the at least a pair of reflected optical signals from the second micromirror assembly;

wherein the plurality of different scanning modes includes at least two different scanning modes executed simultaneously by the emitter/detector subsystem using the first and second independent transmitting channels of the first micromirror assembly and the first and second independent receiving channels of the second micromirror assembly, wherein the scanning modes relate to at least one of different scanning patterns or different scanning resolutions employed simultaneously using the first and second independent transmitting channels and the first and second independent receiving channels;

wherein only the reflected light reflected back from the scene is used in implementing the first and second independent receiving channels; and wherein the emitter/detector subsystem further includes a pixel allocation micromirror disposed upstream of the detector, relative to the reflected optical signals received by the first and the second micromirror assembly, and having an array of mirrors which are mapped to specific ones of the first and the second micromirror assembly for steering light received from the first and the second micromirror assembly to specific pixels forming an image plane on the detector.

* * * * *